United States Patent [19]
Llewellyn et al.

[11] Patent Number: 5,426,539
[45] Date of Patent: Jun. 20, 1995

[54] MULTIPLE GAP READ/WRITE HEAD FOR DATA STORAGE DEVICES

[75] Inventors: William D. Llewellyn; Robert J. Strain, both of San Jose, Calif.

[73] Assignee: National Semiconductor Corporation, Santa Clara, Calif.

[21] Appl. No.: 984,660

[22] Filed: Dec. 1, 1992

[51] Int. Cl.6 .............................................. G11B 5/09
[52] U.S. Cl. ..................................................... 360/51
[58] Field of Search .................... 360/46, 36.2, 51, 67, 360/68, 39, 53, 54, 63, 121

[56] References Cited

U.S. PATENT DOCUMENTS

| | | | |
|---|---|---|---|
| 3,579,214 | 5/1971 | Solyst | 340/174.1 F |
| 4,138,694 | 2/1979 | Doi et al. | 358/127 |
| 4,141,039 | 2/1979 | Yamamoto | 360/32 X |
| 4,669,015 | 5/1987 | Roigrok | 360/119 |
| 4,885,646 | 12/1989 | Kanota et al. | 360/46 |
| 5,157,561 | 10/1992 | Makise et al. | 360/51 X |

OTHER PUBLICATIONS

Terry Costlow, "Tech advances offset price wars", Electronic Engineering Times, Dec. 1993, pp. 48 and 74.

*Primary Examiner*—Donald Hajec
*Assistant Examiner*—Thien Minh Le
*Attorney, Agent, or Firm*—H. Donald Nelson; David E. Steuber; Stephen R. Robinson

[57] ABSTRACT

A multiple-gap head for transferring data to or from a storage medium is disclosed. Data read by the gaps are directed over a plurality of serial data paths where the data are processed and synchronized. In some embodiments, all or part of a data synchronizer is shared by the serial data paths. The data are then assembled into a parallel data stream for delivery to a computer. Reading the data simultaneously with multiple gaps increases by several times the rate at which data can be transferred to or from a storage medium. In accordance with another aspect of the invention, a three-gap head is provided to reduce or eliminate the cross-talk or noise fringe problems which reduce the track density in a storage medium. A signal attenuator and a signal inverter are connected to each of the side gaps and the outputs thereof are summed with the signal originating at the center gap, such that the inverted signals from the side gaps cancel any cross-talk originating at the center gap. Similarly, an attenuator and an inverter are connected between the write data path (leading to the center gap) and each of the side gaps. During write operations the magnetic flux produced at each of the side gaps has the effect of focusing the magnetic flux produced at the center gap, thereby reducing or eliminating the noise fringe of the written data track.

38 Claims, 16 Drawing Sheets

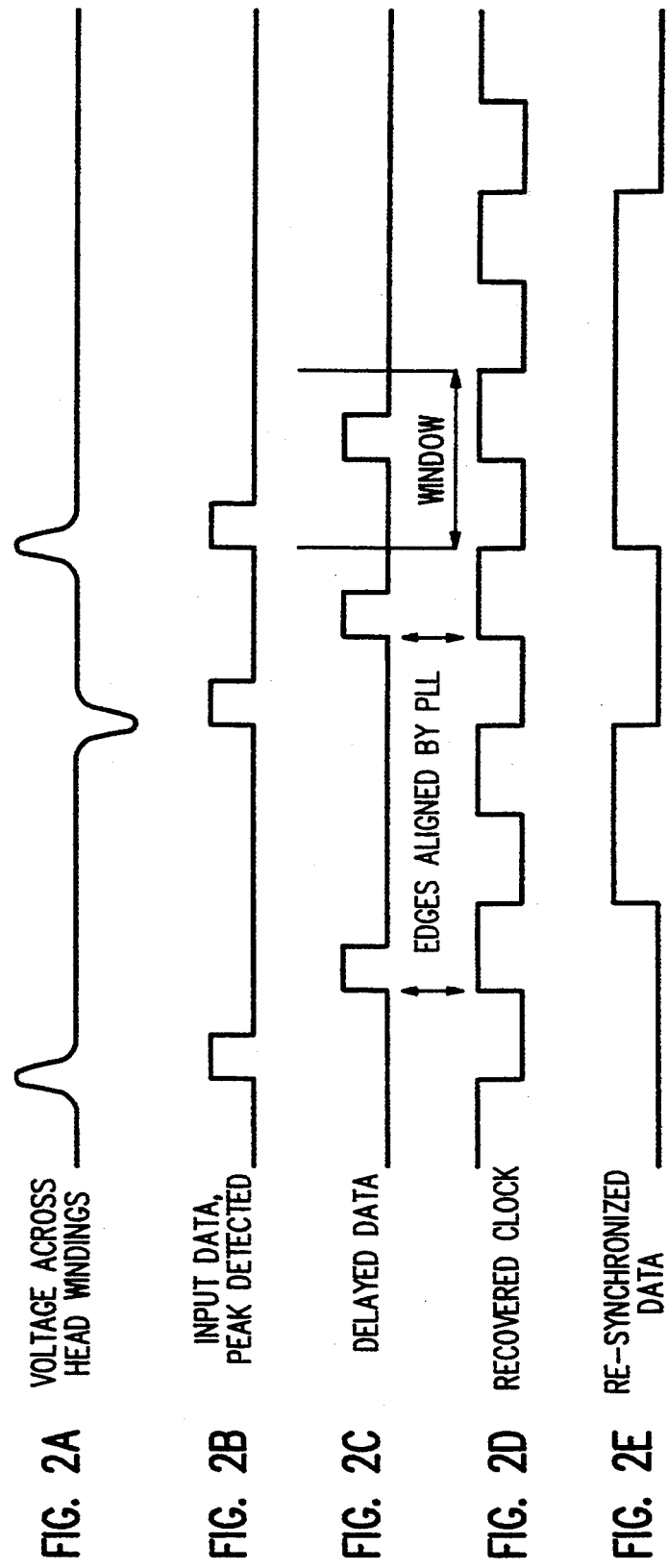

MULTIPLE GAP READ/WRITE HEAD FOR DATA STORAGE DEVICES

FIELD OF THE INVENTION

This invention relates to recording heads used for transferring data to or from a storage medium and, in particular, to a recording head which includes a plurality of magnetic poles and gaps.

BACKGROUND OF THE INVENTION

Magnetic storage media, typically in the form of disks, are widely used in the computer industry to increase the amount of storage capacity beyond what is available in the computer's internal memory. While such devices greatly expand the storage capacity of the computer, the data stored in them cannot be retrieved as quickly or easily as data stored in, for example, a random access memory (RAM).

Data are conventionally recorded on a disk in concentric tracks. A head reads the tracks and produces a serial, one-bit wide data stream. The data may then be passed through a shift register and converted into a parallel data stream. However, to retrieve data over an 8-bit (1byte) parallel bus at 6 megabytes per second, the serial data must be read at 48 megabits per second. While this rate is achievable with today's technology, higher rates, for example, 60 or 100 megabits per second, stretch the capabilities of a serial data path. Thus the serial data path extending from the head represents a "bottleneck" which potentially limits the ability of the computer to retrieve data from the storage disk. Similar considerations apply to the write operation.

The term "track density" refers to the number of tracks which occupy a given radial distance on the disk; the track "pitch" is the reciprocal of the track density. In a typical low-cost Winchester disk, the track density is around 1000 tracks per inch, and densities of twice this value are achieved in more sophisticated drives. Obviously the quantity of information that can be stored is directly related to the track density.

Data are generally written to and read from the magnetic medium by means of a "gap", which refers to the separation between the tips of a pair of magnetic poles. One of the factors that has limited increases in the track density is the existence of cross-talk between adjacent tracks. During the reading operation, the gap tends to pick up data from adjacent tracks. This decreases the signal-to-noise ratio of the read channel, and increases the probability of errors in the interpretation of the data. Increasing the track density (i.e., reducing the track pitch) exacerbates this problem.

In the writing process, magnetic flux lines from the pole tip on one side of the gap extend downward, through the magnetic medium, and into the other pole tip. Ideally, the width of the pole tips should coincide with the width of the written data track. However, in reality some of the magnetic flux lines near the side edges and corners of the pole tips extend laterally outward beyond the edge of the track and create a "noise fringe" along the edge of the track. This noise fringe also limits the track density.

Various embodiments according to this invention provide for an increased rate of data transfer to and from a magnetic storage medium, and a reduction of the crosstalk and noise fringe problems.

SUMMARY OF THE INVENTION

According to this invention, a plurality of gaps are included in a single read-write head. Each of the gaps is associated with a serial data path which contains circuitry for processing the electrical signals which originate from the gap during the read operation. This circuitry, which may include a preamplifier, a filter, and a peak detector, converts the signal into a form in which it is ready to be synchronized with the electronics of the disk drive. After the data have been synchronized, data bits from each serial path are assembled into a parallel data stream.

In one embodiment, a single data synchronizer is shared by all of the serial data paths. This is possible because the head and storage medium are made of rigid material, and the distances between the gaps and the tracks on the medium are very small. Therefore, the data in the parallel paths are synchronized with each other. In other embodiments, the serial data paths may share a portion of a data synchronizer, or each data path may contain a separate data synchronizer. Whatever the specific embodiment, the use of multiple serial data paths significantly increase the data transfer rate of the disk drive.

The gaps may be spaced at a distance equal to the track pitch, or they may be spaced at some multiple thereof, with one or more tracks positioned between each of the gaps.

According to another aspect of this invention, an arrangement is provided which is useful in reducing the cross-talk problem. Three gaps are positioned side-by-side in a head, separated from each other by a distance equal to the track pitch. The center gap is used for reading and writing, and the two side gaps are connected to attenuation and phase inversion circuitry. The outputs of the three gaps are then summed. The attenuation circuitry is adjusted such that the signals processed by the summing device from the side gaps exactly counterbalance any cross-talk from the adjacent tracks that is picked up by the center gap.

In accordance with another aspect of this invention, three gaps are spaced side by side as described above. The write circuitry of the two side gaps is connected through an inverter and an attenuator to the write circuitry for the center gap. As a result, when the center gap is engaged in writing data, an attenuated, oppositely-phased signal appears at each of the side gaps. These signals tend to concentrate or focus the flux from the center gap onto the target track. This reduces or eliminates the noise fringe at the edges of the data track.

BRIEF DESCRIPTION OF THE DRAWINGS

FIGS. 2A–2E illustrate waveforms at various points in a read channel.

DESCRIPTION OF THE INVENTION

Figure 1A:
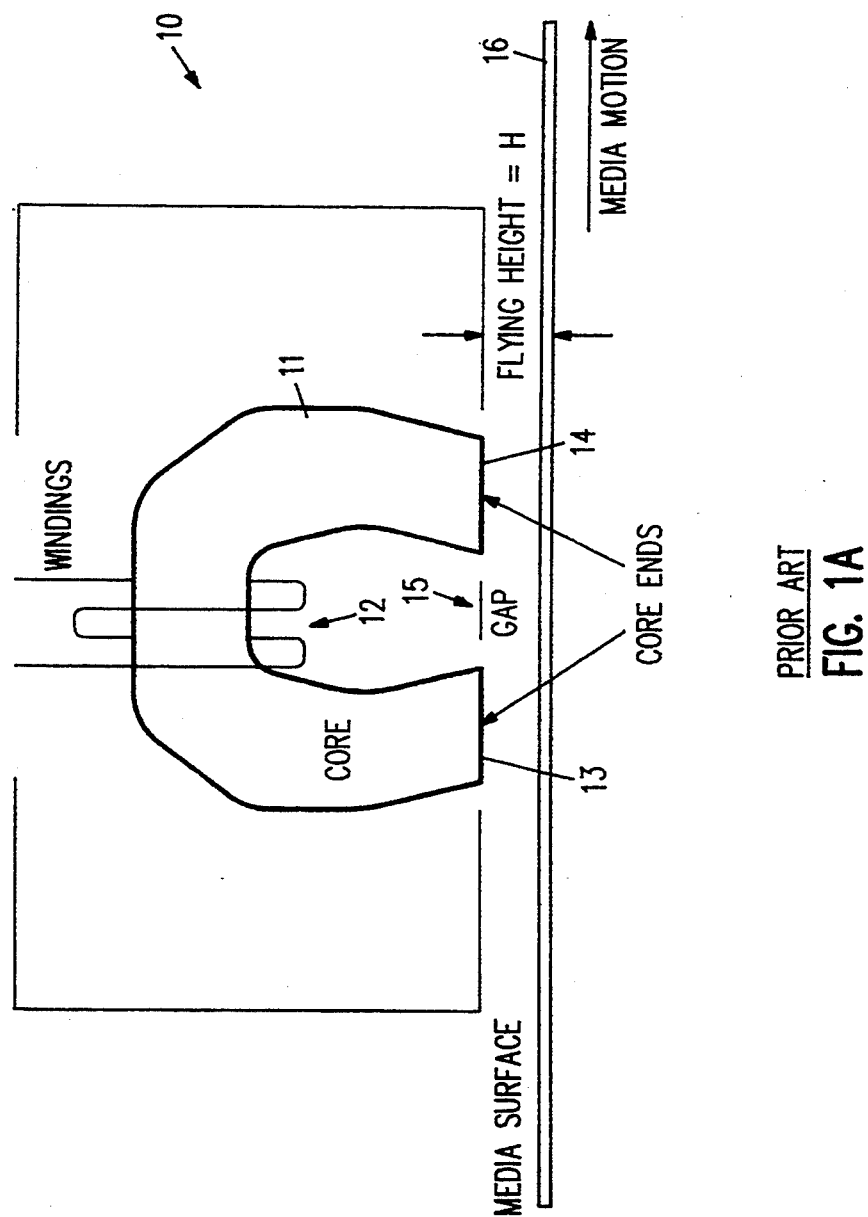
FIG. 1A illustrates a conceptual cross-sectional view of a recording head over a recording medium.
Figure 1C:
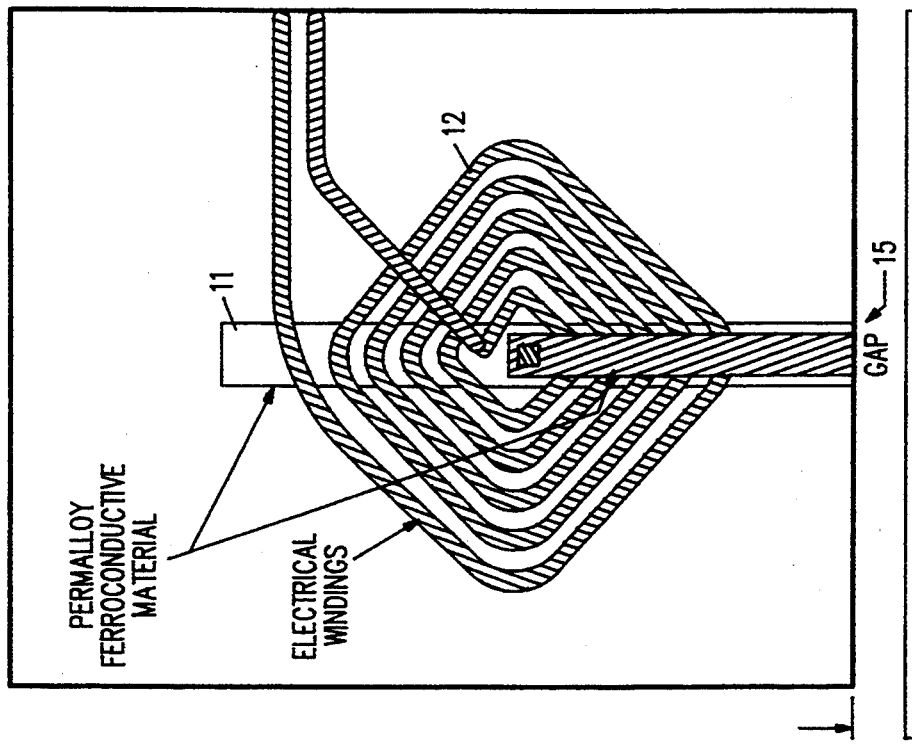
FIGS. 1B and 1C illustrate cross-sectional and side views of a recording head.
Figure 1B:
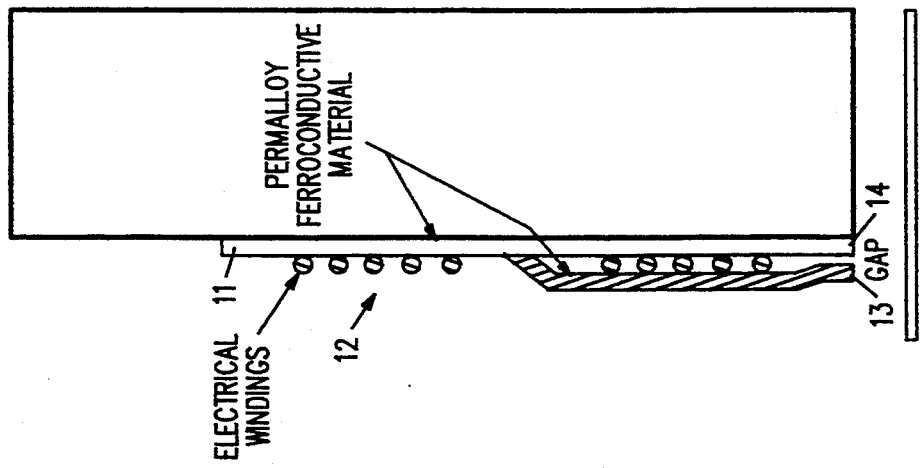

FIG. 1 illustrates a conceptualized side view of a recording head over a medium. A recording head 10 includes a magnetic core 11 encircled by windings 12. Magnetic core 11 terminates in pole tips 13 and 14 which are separated by a gap 15. When in operation head 10 is suspended at a flying height H over a recording medium 16, which travels to the right in FIG. 1. During write operations as signals appear in windings 12, a magnetic field is created in core 11, and flux lines emanate from pole tips 13 and 14 and project into recording medium 16. Recording medium 16, which is coated with a magnetic material such as iron oxide, becomes magnetized, the polarity of the magnetism depending on the direction of the current in windings 12. Typically, a reversal of the polarity of the induced magnetism indicates a binary 1, and the absence of a polarity reversal indicates a binary 0.

During reading operations, the situation is reversed. When gap 15 flies over a transition from one magnetic polarity to another (whatever the direction) the magnetic field induced in core 11 is reversed and a current pulse is induced in windings 12. These pulses, which may be either positive or negative and which represent data stored in a data track on the storage medium, from a train of pulses which are processed as described below and interpreted as binary 1's. The absence of pulses is interpreted as a binary 0.

FIG. 2A illustrates the pulse train originating from the gap during a read operation.

Figure 3:
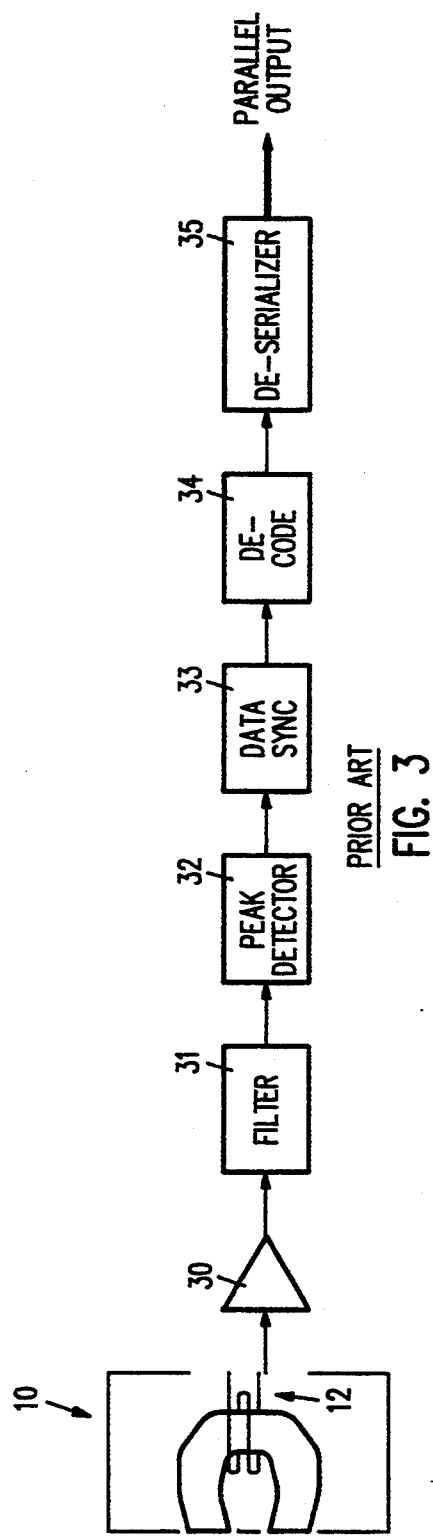
FIG. 3 illustrates a block diagram of a conventional serial data path.

FIG. 3 illustrates a block diagram of a conventional serial read channel associated with a head 10. The output from windings 12 is passed through a preamplifier 30 and a filter 31 to a peak detector 32. The output of peak detector 32 is illustrated in FIG. 2B, each positive transition representing a flux reversal on the storage medium. After the signal leaves peak detector 32, it passes through a data synchronizer 33, a decoder 34, and a de-serializer 35, typically a shift register, where it is converted to a parallel output.

Figure 4:
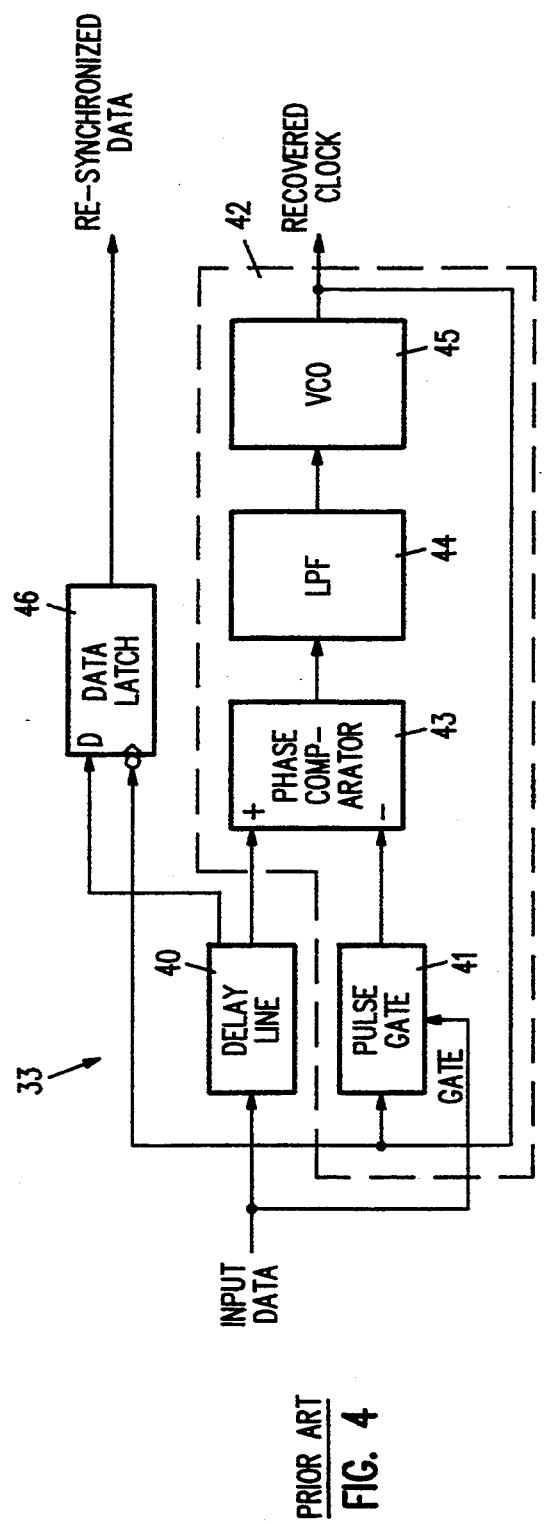
FIG. 4 illustrates a block diagram of a data synchronizer which may be used in an embodiment according to the invention.

FIG. 4 illustrates a block diagram of data synchronizer 33. The signal from peak detector 32 is delivered to a half-cell delay line 40 and to the gate input of a pulse gate 41. The output of delay line 40 constitutes the input of a phase-locked loop 42 which includes a phase comparator 43, a low-pass filter 44, and a voltage controlled oscillator (VCO) 45. Phase-locked loop 42 is completed by connecting the output of VCO 45 to the clock input of pulse gate 41, and by connecting the output of pulse gate 41 to the negative input terminal of phase comparator 43. VCO 45 has a duty cycle of 50% and the delay imposed by delay line 40 is equal to one-half cycle of VCO 45.

Advantageously, phase comparator 43 is a digital phase detector as described in National Semiconductor's Mass Storage Handbook, 1989 Edition, pp. 9-36 to 9-39, incorporated by reference herein, and pulse gate 41 is of the kind described in co-owned and copending Application Serial No. 07/664,911. VCO 45 is advantageously a starved-ring oscillator or an emitter-coupled multivibrator plus a toggling flip-flop for 50% duty cycle generation.

Phase-locked loop 42 forces the phase from the output of VCO 45 to track the phase of the output signal from delay line 40. To the extent that there is a difference in the phase of these two signals, phase comparator 43 generates an "error" signal at its output which is proportional to the sensed phase difference. This error signal is filtered by low-pass filter 44, to suppress any unwanted high-frequency components, and it is then fed to the input of VCO 45. If the phase of the signal from delay line 40 leads that of the output of VCO 45, phase comparator 43 develops a positive error voltage across filter 44 and VCO 45 responds by increasing its frequency (advancing phase). This process continues until the error signal is eliminated and the control voltage returns to a quiescent value. If the signal received by phase comparator 43 from delay line 40 lags the output of VCO 45, the control voltage is reduced until equilibrium is again obtained. FIGS. 2C and 2D illustrate the signals at the positive terminal of phase comparator 43 and at the output of VCO 45, respectively (pulse gate 41 is presumed to be delayless for this analysis).

Pulse gate 41 ensures that VCO 45 is not disturbed by the fact that no pulse from delay line 40 appears when a binary 0 appears in the data stream. When pulse gate 41 receives a pulse at its gate input, it passes the next pulse which arrives at its data input. Thus phase comparator 43 only receives a pulse at its negative terminal when there is a pulse from delay line 40 at its positive terminal. In other words, no phase comparison is made when a binary 0 appears in the data stream.

The output of delay line 40 is also delivered to the data input of a data latch 46. The clock signal at the output of VCO 45 is inverted and delivered to the clock input of data latch 46. Thus, when a pulse from delay line 40 appears at data latch 46, data latch 46 remembers this and delivers an output the next time the clock output of VCO 45 goes low. Since VCO 45 has a duty cycle of 50%, this establishes a "window" around the pulses delivered by delay line 40 (see FIG. 2C), with each pulse ideally positioned in the center of the window. In reality, owing to "pulse jitter" the pulses may be either early or late, but so long as they are within the window (rising edge < ½ cycle early or late) they will be interpreted correctly. As shown in FIG. 2E, the (high) output of data latch 46 lasts for one clock cycle. Thus phase-locked loop 42 provides a "recovered" clock pulse and data latch 46 provides a re-synchronized form of the data stream which flows from peak detector 32.

Figure 5:
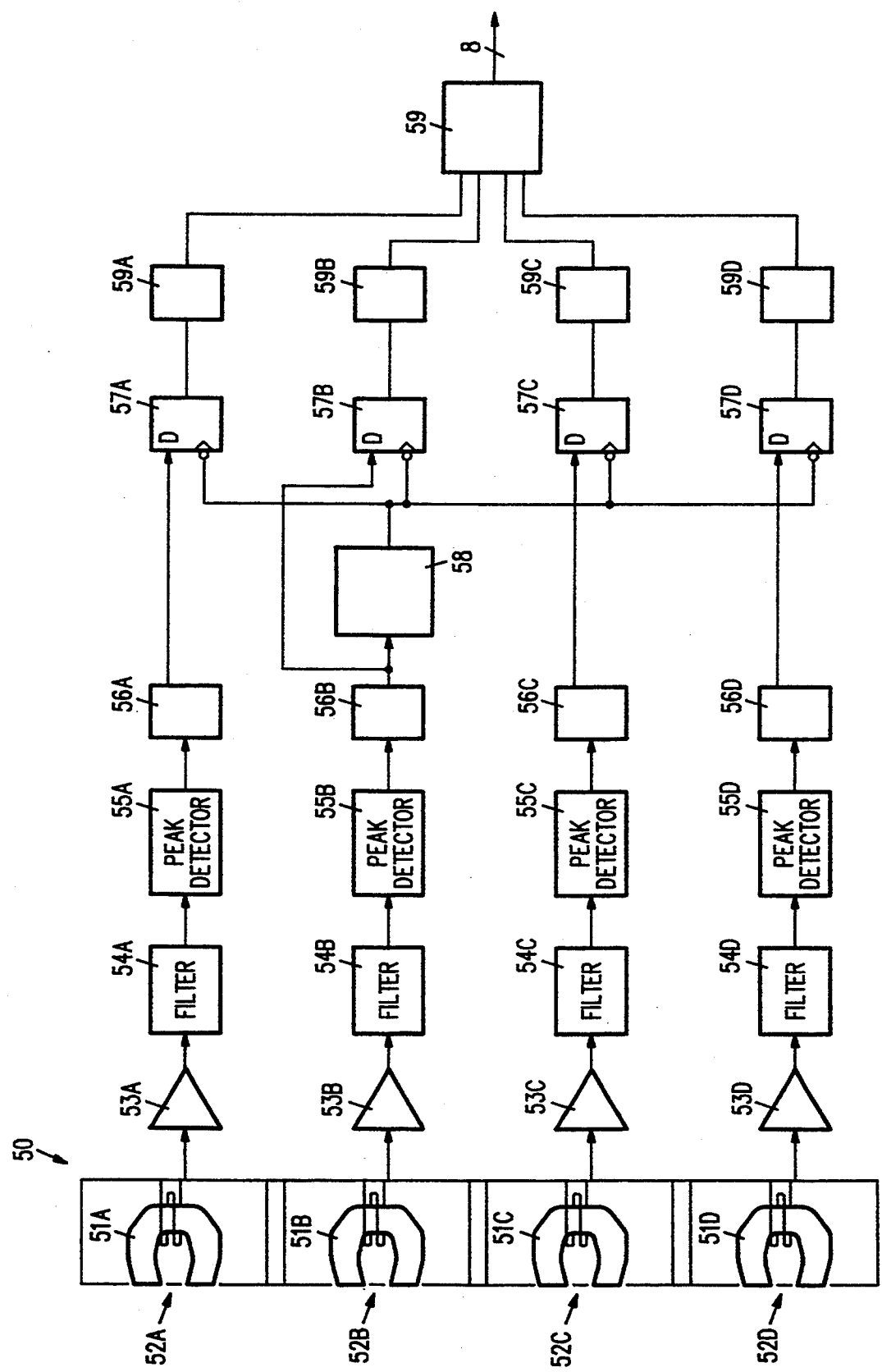
FIG. 5 illustrates a block diagram of multiple serial data paths arranged in accordance with the invention.
Figure 6:
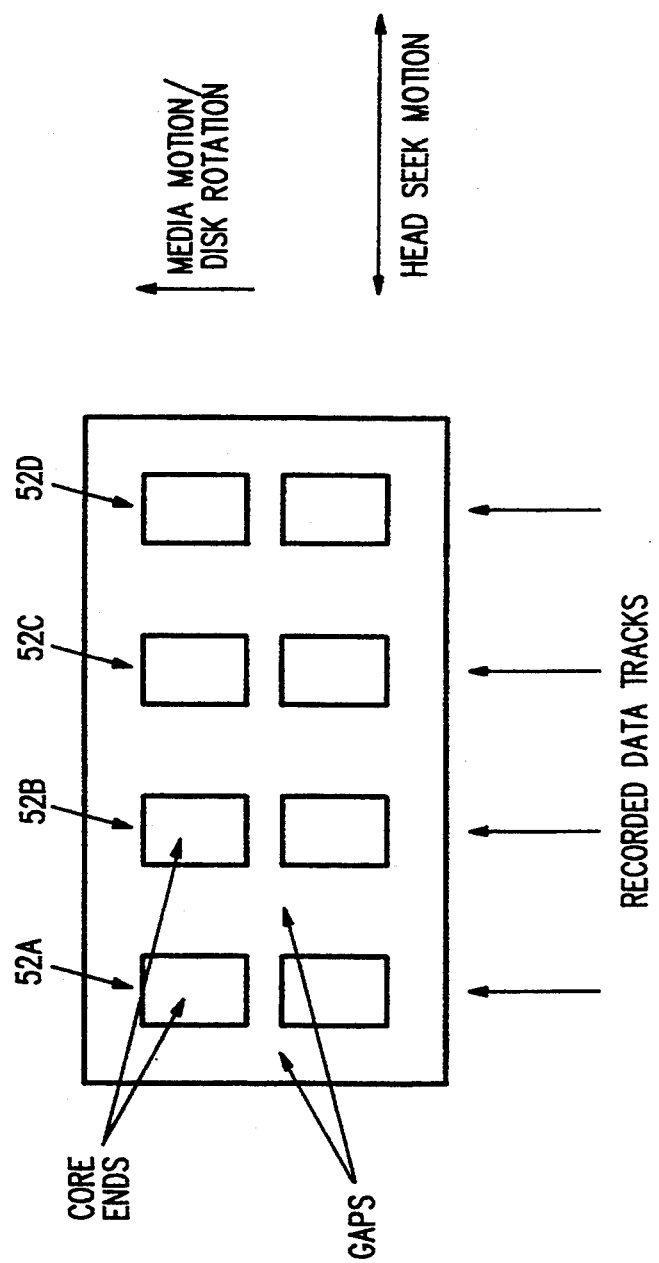
FIG. 6 illustrates a conceptual view of a multiple gap head, viewed from the recording surface.

FIG. 5 illustrates a block diagram of a multiple gap head with multiple read channels in accordance with the invention. A head 50 includes four magnetic poles 51A–51D which define gaps 52A–52D. (For the sake of clarity, poles 51A–51D are turned 90 degrees.) Preamplifiers 53A–53D, filters 54A–54D, and peak detectors 55A–55D are similar to the corresponding elements shown in FIG. 3. Data latches 57A–57D are similar to data latch 46, decoders 59A–59D are similar to decoder 34 and a single phase-locked loop 58 is similar to phase-locked loop 42, shown in FIG. 4. A bottom view of gaps 52A–52D is shown in FIG. 6, the gaps being arranged side-by-side along a line perpendicular to the movement of a storage medium relative to the head.

Since the positions of gaps 52A–52D with respect to each other is rigidly fixed, the data streams originating at gaps 52A–52D are synchronized among themselves. Phase-locked loop 58 can therefore be used to recover the clock pulse from the data originating at gap 52B, and this recovered clock pulse can be used to re-time the data from each of gaps 52A–52D. Thus the output of phase-locked loop 58 is delivered (in inverted form) to the clock inputs of data latches 57A–57D. The omission of individual phase-locked loops for each of the data paths represents a significant reduction in the complexity of the system over prior art arrangements. The outputs of peak detectors 55A–55D are delivered to the data inputs of data latches 57A–57D, respectively, where they in effect "share" the recovered clock signal provided by phase-locked loop 58. The outputs of latches 57A–57D are delivered to a de-serializer 59, where they are converted into a byte-wide parallel data stream. It will be apparent that this invention is not limited to any particular number of gaps or heads, and in some arrangements it may be possible to eliminate the deserializer. For example, if eight gaps are included in the head, a byte-wide data stream would result without the need for de-serialization. Moreover, in an alternative embodiment a single decoder downstream from de-serializer 59 may be substituted for decoders 59A–59D.

Figure 7:
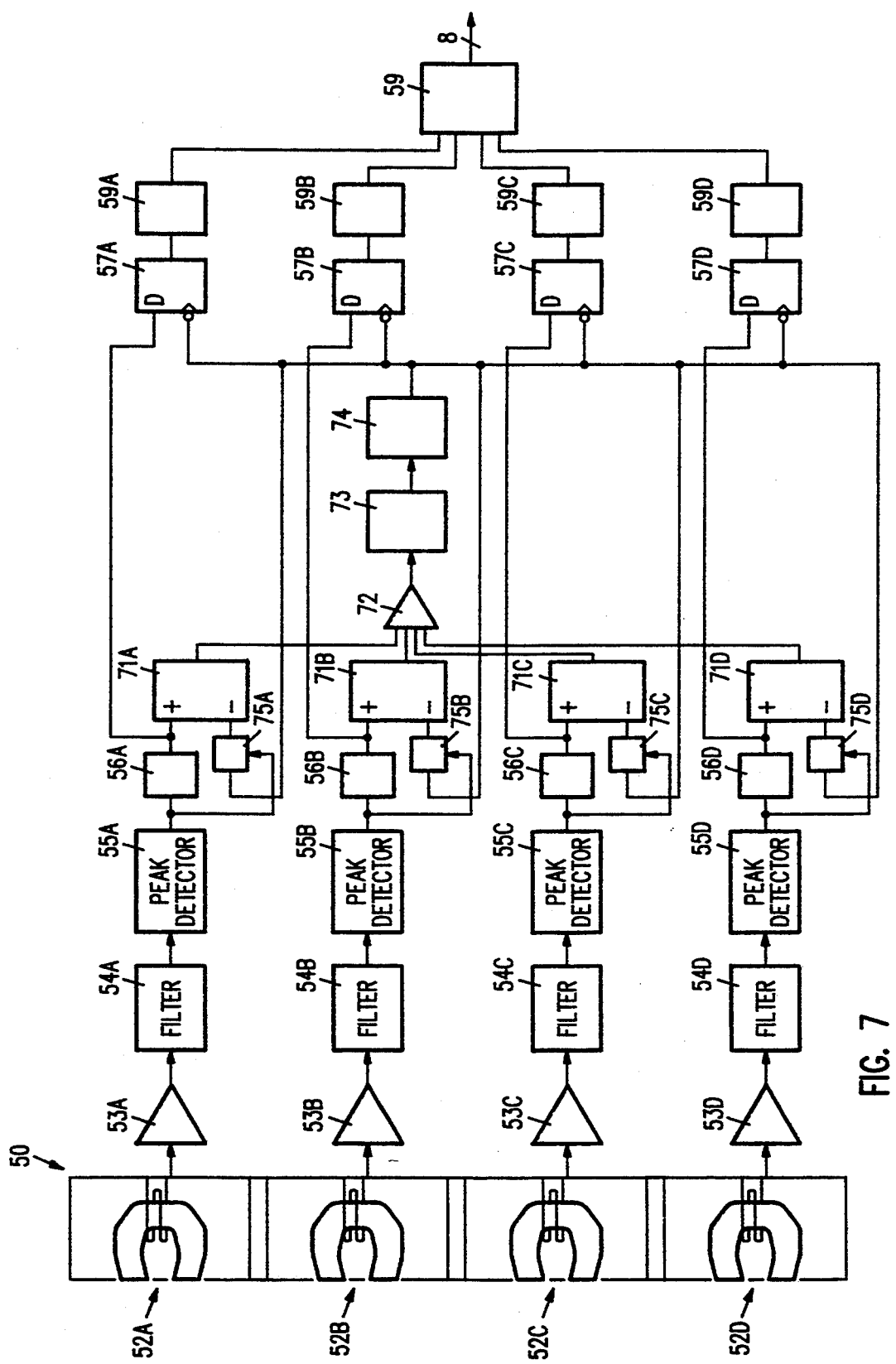
FIG. 7 illustrates a block diagram of multiple serial data paths arranged in accordance with an alternative embodiment of the invention.

FIG. 7 illustrates an arrangement in which each data stream has a separate phase comparator and pulse gate, but the voltage controlled oscillator and low-pass filter are shared. Head 50, preamplifiers 53A–53D, filters 54A–54D, and peak detectors 55A–55D are arranged as in FIG. 5. The outputs of peak detectors 55A–55D, however, are passed through delay lines 56A–56D to the positive inputs of phase comparators 71A–71D. The outputs of phase comparators 71A–71D are summed in a summing amplifier 72 and passed through a low-pass filter 73 and a VCO 74. The output of VCO 74 is fed back through pulse gates 75A–75D to the negative inputs of phase comparators 71A–71D. The gate inputs of pulse gates 75A–75D are controlled by the outputs of peak detectors 55A–55D, respectively, and the outputs of delay lines 56A–56D are connected to the data inputs of data latches 57A–57D, respectively. The output of VCO 74 is also connected to the clock inputs of data latches 57A–57D. As in the embodiment of FIG. 5, the outputs of data latches 57A–57D feed through decoders 59A–59D into de-serializer 59, which has an 8-bit parallel output.

In the embodiment of FIG. 7 the error signals flowing from phase comparators 71A–71D are summed, yielding a timing "window" which is based on the data flowing from each of gaps 52A–52D. This timing window is, on average, more accurate than a window derived from only a single one of the data tracks, as in FIG. 5. However, the embodiment of FIG. 7 requires more circuitry than the embodiment of FIG. 5, and in some circumstances the additional cost of this circuitry is not justified by the increased accuracy.

The data are encoded prior to recording to make sure that they contain adequate timing information (spectral limitation). This ensures, for example, that a string of zeros is recorded with enough transitions (ones) to allow the phase-locked loop to remain locked on the data stream. In the embodiment of FIG. 5, this timing information need only be recorded in the data track underlying gap 52B, increasing the information storage capacity of the data tracks underlying gaps 52A, 52C and 52D. With the embodiment of FIG. 7, all four data tracks must contain timing information. Similarly, in the embodiment of FIG. 5 the "servo burst" information that is used in aligning the head need only be recorded in the data track under gap 52B. This frees additional information storage space in the other three tracks.

Figure 8:
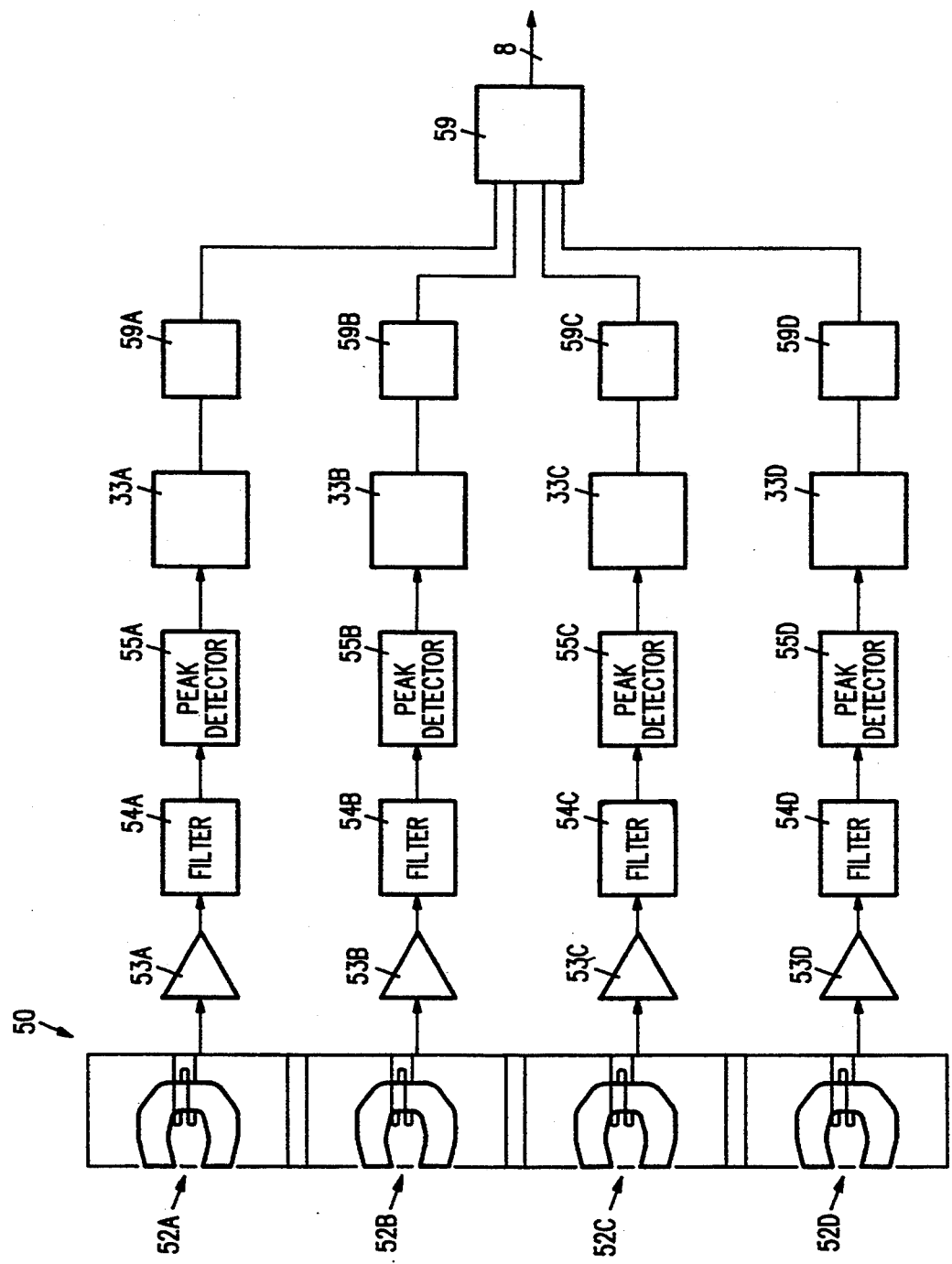
FIG. 8 illustrates a block diagram of multiple serial data paths arranged in accordance with a third alternative embodiment of the invention.

A second alternative embodiment is illustrated in FIG. 8. Head 50, amplifiers 53A–53D, filters 54A–54D, and peak detectors 55A–55D are similar to the similarly numbered components in FIGS. 5 and 7. The outputs of peak detectors 55A–55D are delivered to the inputs of data synchronizers 33A–33D, each of which is similar to the data synchronizer 33 illustrated in FIG. 4. The outputs of data synchronizers 33A–33D flow through decoders 59A–59D to de-serializer 59, which delivers a parallel output 8-bits wide.

Many forms of data synchronizers are known in the art and may be substituted for the data synchronizer illustrated in FIG. 4. An alternative form of data synchronizer is described, for example, in U.S. Pat. No. 5,027,085. All such data synchronizers may be used in embodiments in accordance with the broad principles of this invention.

The principles of this invention are also applicable to arrangements which are referred to as "sampled data channels". Such arrangements are described in numerous sources, including Shahid U. H. Qureshi, "Time Recovery For Equalized Partial-Response Systems" IEEE Trans on Commun., December 1976, pp. 1326–1331; Kurt H. Mueller et al., "Timing Recovery in Digital Synchronous Data Receivers" IEEE Trans on Commun, Vol 24 No. 5, May 1976, pp. 516–531; and W. L. Abbott et al., "Timing Recovery for Adaptive Decision Feedback Equalization of the Magnetic Storage Channel", Globecom. '90, Paper 901.6, pp. 1–13, all of which are incorporated herein by reference.

In sampled data channels, the amplified and filtered analog data are passed directly into a system such as a partial response maximum likelihood (PRML) system or a decision feedback equalization (DFE) system. In these systems, symbol recognition (presence or absence of data ones) and clock recovery are accomplished by digital or hybrid digital/analog means which do not rely on the position of the pulse peak but instead rely on periodic sampling of the waveform amplitude. These systems are considered to be more effective than conventional data synchronizers in extracting data in conditions of greater pulse crowding and intersymbol interference, or in conditions of higher noise.

Figure 17:
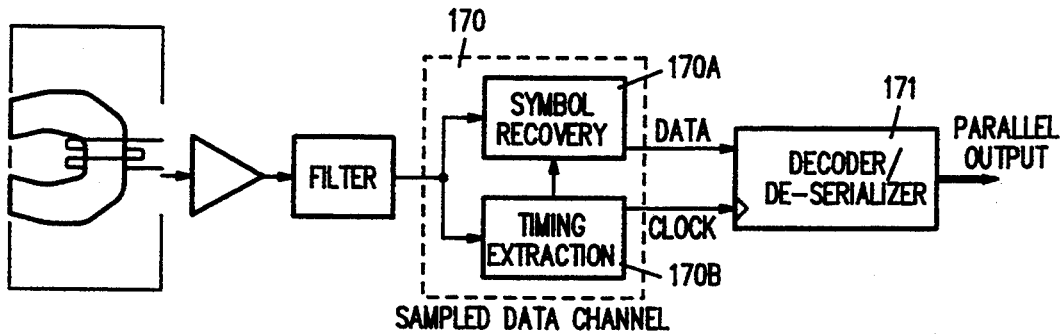
FIG. 17 illustrates a block diagram of a conventional serial data path which includes a sampled data channel.

In sampled data channels the tasks of symbol recognition and timing extraction are essentially separate functions. FIG. 17 illustrates a sampled data channel 170. Sampled data channel 170 includes a symbol recovery block 170A and a timing extraction block 170B. Blocks 170A and 170B deliver a data signal and a clock pulse signal, respectively, to a decoder/de-serializer 171.

Figure 18:
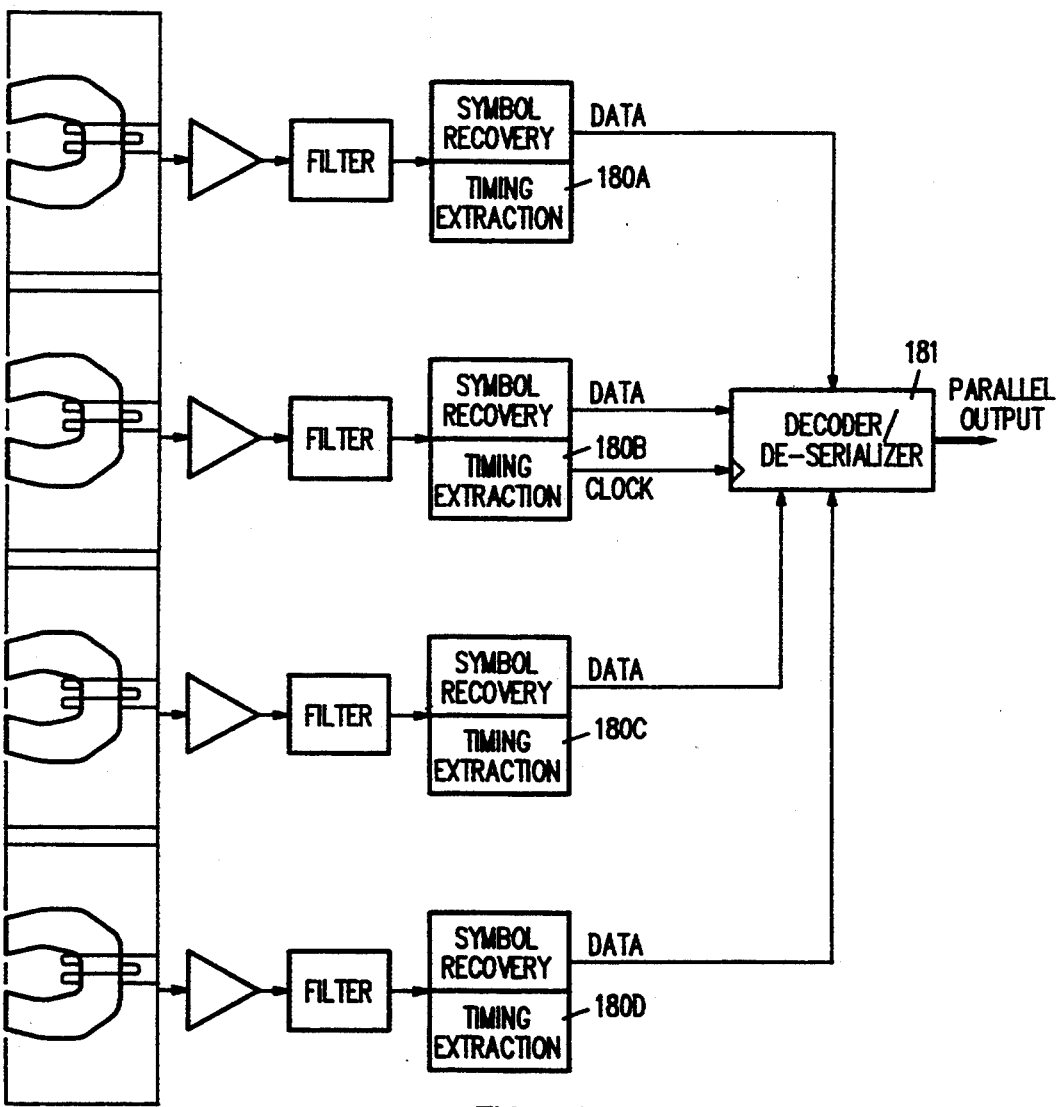
FIG. 18 illustrates a block diagram of multiple serial data paths in accordance with the invention, each including a sampled data channel.
Figure 19:
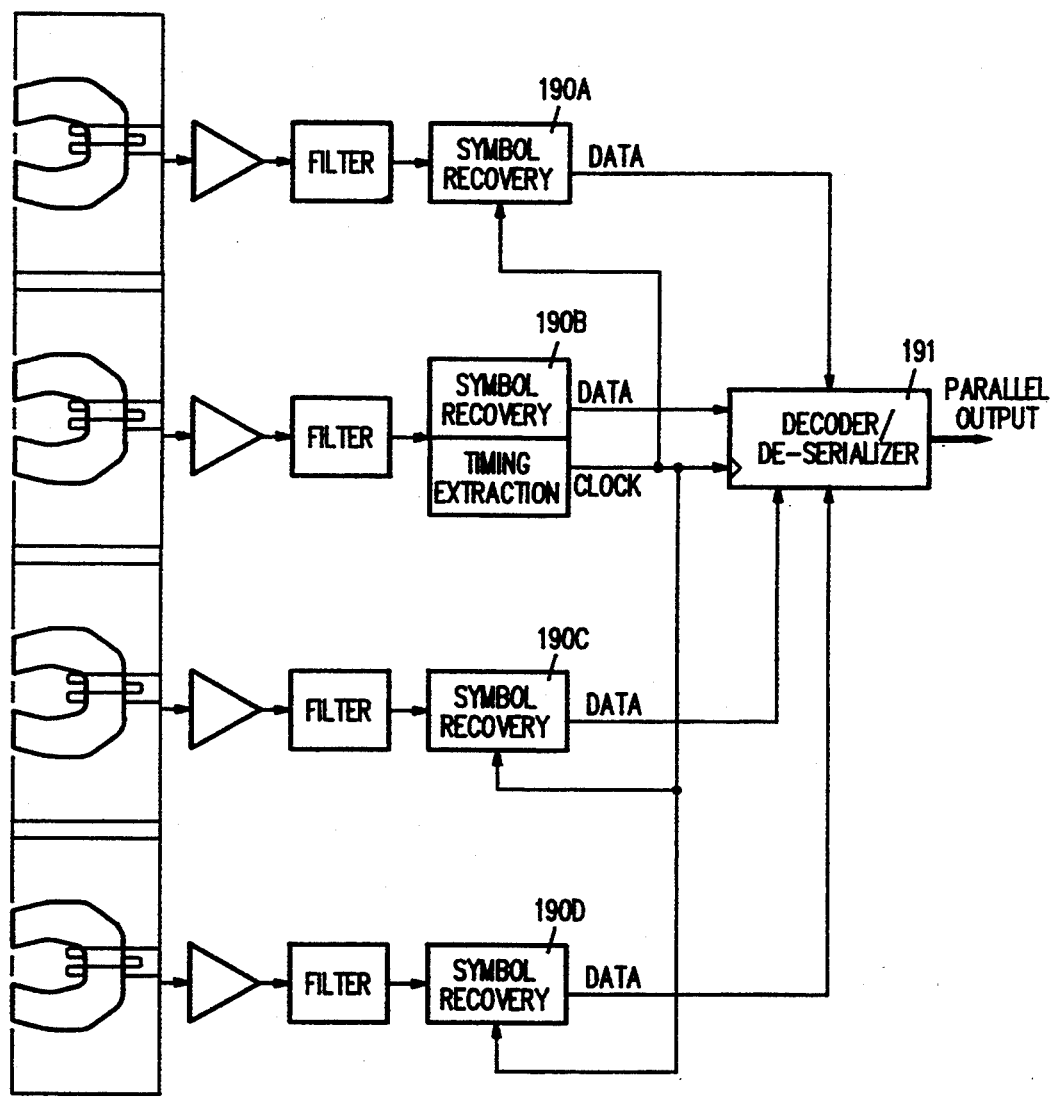
FIG. 19 illustrates a block diagram of multiple serial data paths in accordance with the invention, one of which contains a sampled data channel which generates a clock pulse that is shared by symbol recovery programs in each of the data paths.

FIG. 18 illustrates a group of four sampled data channels 180A–180D, which are connected in four data paths in accordance with this invention. Each of sampled data channels 180A–180D is similar to sampled data channel 170 and delivers a data stream to a decoder/de-serializer 181. The timing extraction block within sampled data channel 180B delivers a clock pulse to decoder/de-serializer 181. FIG. 19 illustrates a similar arrangement, except that the timing extraction block is omitted from sampled data channels 190A, 190C and 190D, and those units share a clock pulse generated by sampled data channel 190B. It is also possible that the timing information in each of the sampled data channels could be averaged into a single clock pulse, which could then be used by the symbol recovery program in each sampled data channel.

Figure 9:
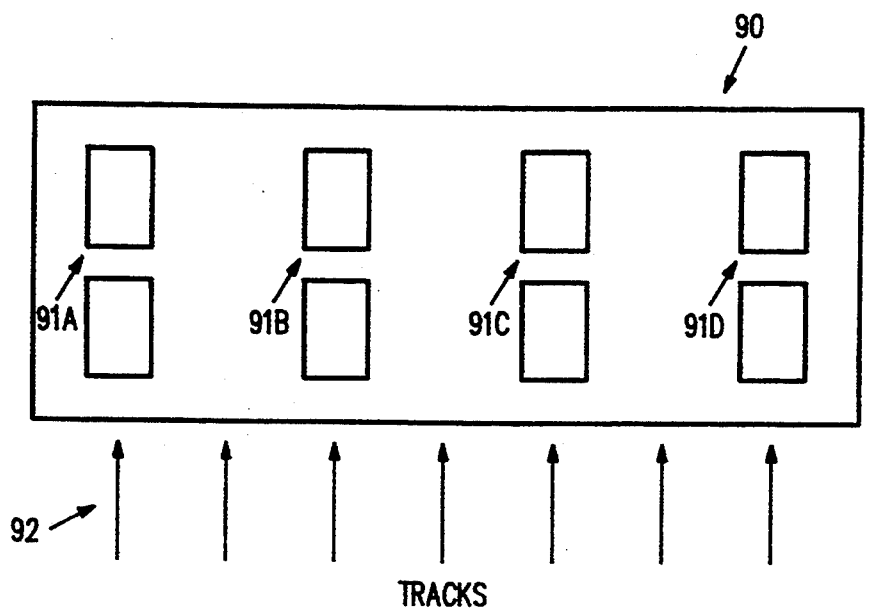
FIG. 9 illustrates a conceptual view of an embodiment in which the gaps are separated by double the track pitch.
Figure 10:
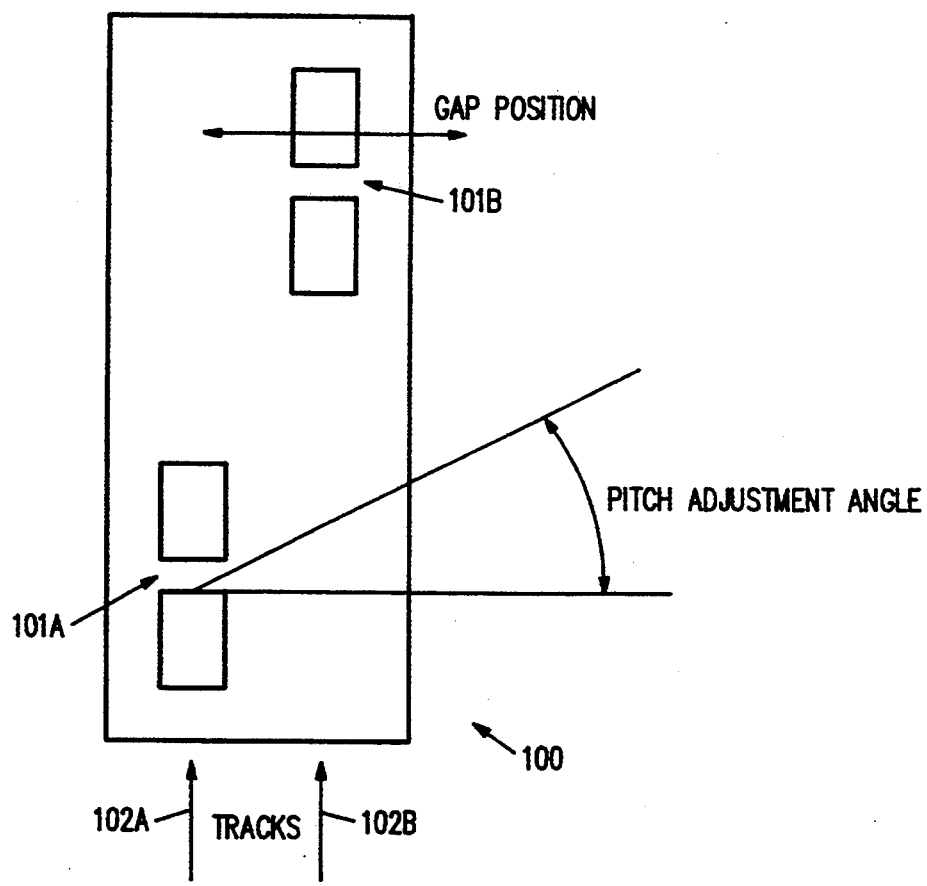
FIG. 10 illustrates a conceptual view of two gaps oriented diagonally so as to permit pitch adjustment.

The individual gaps need not be aligned with adjacent tracks on the storage medium. FIG. 9 illustrates a bottom view of a multiple gap head 90 in which gaps 91A–91D are separated by twice the pitch of tracks 92. The gaps may likewise be separated by other integral multiples of the track pitch, subject only to the limitation that, as the distance between gaps increases, the data streams originating from the gaps will become less synchronized with each other. FIG. 10 illustrates a bottom view of a head 100 in which gaps 101A and 101B are arranged diagonally. Head 100 may be rotated slightly in either direction to ensure that they are accurately aligned with tracks 102A and 102B, respectively.

Figure 11:
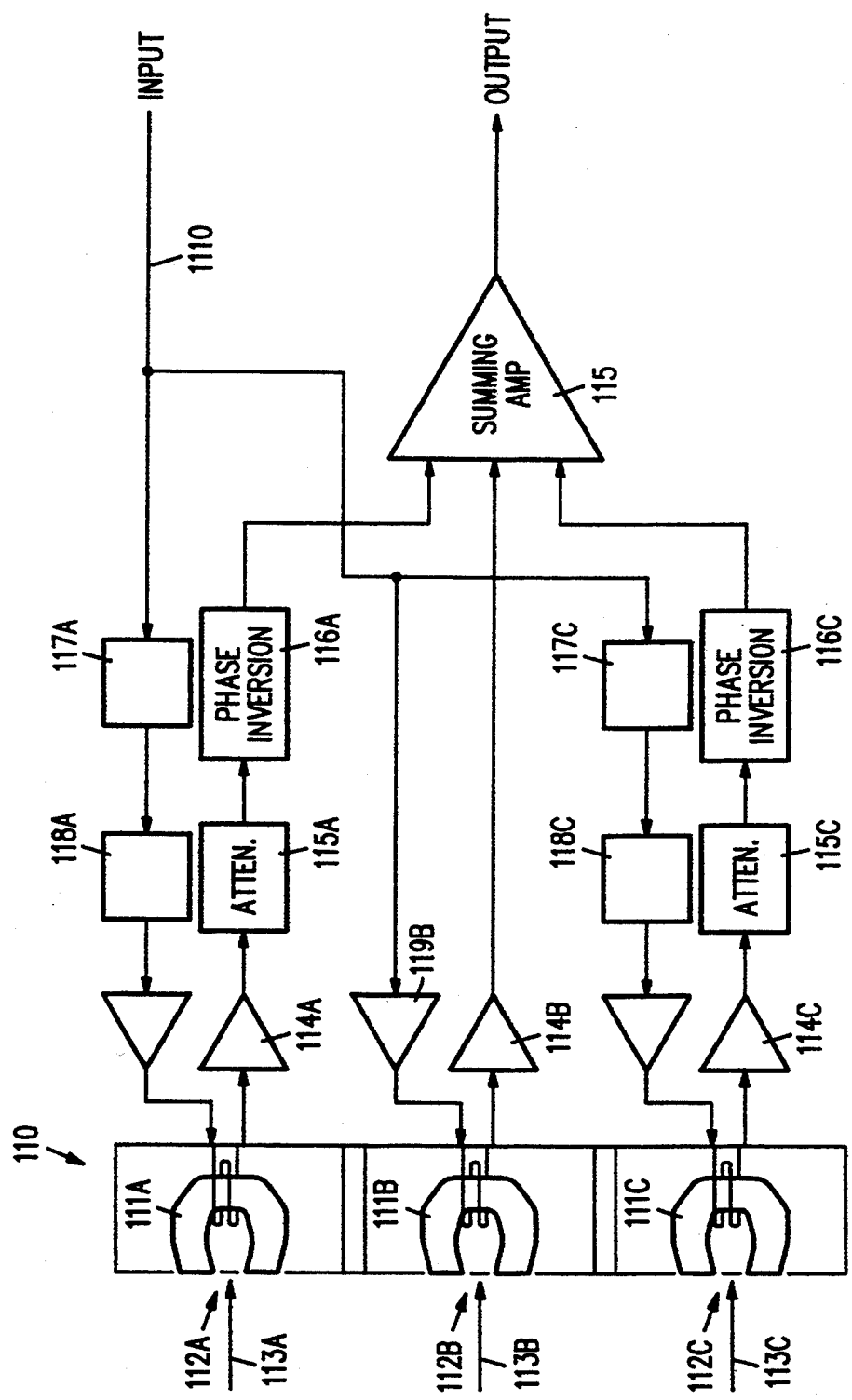
FIG. 11 illustrates a block diagram of the circuity for a three-gap head used for cross-talk and noise fringe reduction.
Figure 13:
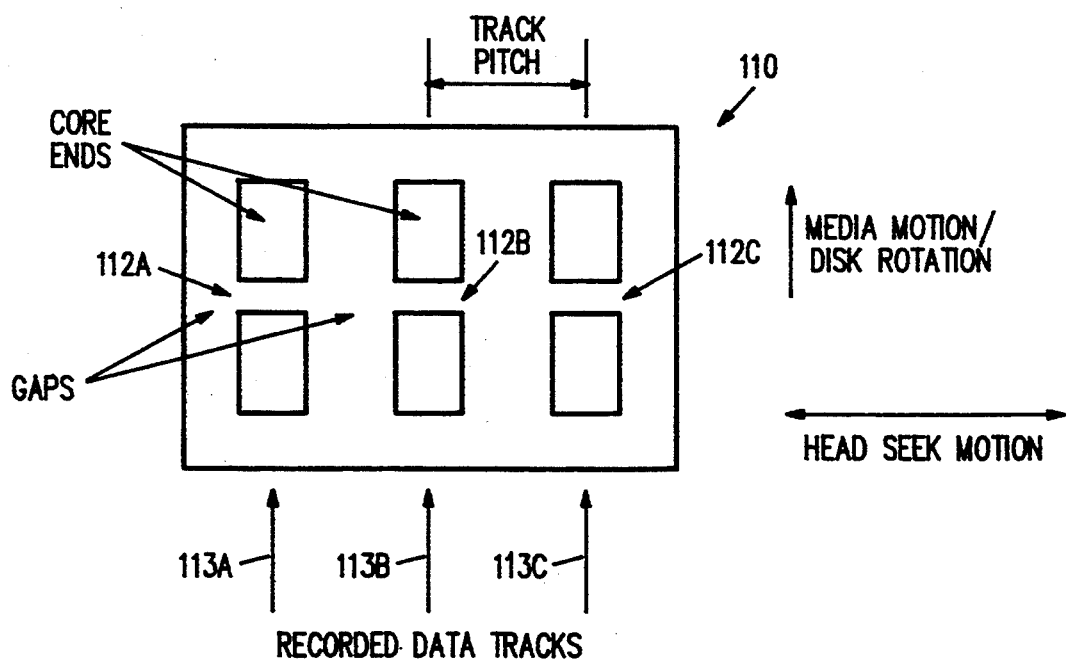
FIG. 13 illustrates a bottom view of a three-gap head used for cross-talk and noise fringe reduction.

In accordance with another aspect of the invention, FIG. 11 illustrates a block diagram of the read and write channels of a multiple-gap head 110. FIG. 13 shows a bottom view of head 110. Head 110 includes three magnetic poles 111A–111C which define gaps 112A–112C. Gap 112B is used to write data to and read data from a track 113B, while gaps 112A and 112C are aligned with adjacent tracks 113A and 113C, respectively. The signal originating at gap 112B is passed through a preamplifier 114B and directed to one input of a summing amplifier 115. The signals originating at gaps 112A and 112C are passed through preamplifiers 114A and 114C, attenuators 115A and 115C and phase inverters 116A and 116C and then delivered to the other inputs of summing amplifier 115.

One of the problems that occurs with a reduced track pitch is that, during the read operation, the head tends to pick up data ("cross-talk") from adjacent tracks. Multiple gap head 110 overcomes this problem. Gap 112A reads the data from track 113A, and the signal output from core 111A is then attenuated and inverted. Attenuator 115A is set to the correct level, so as to exactly offset the cross-talk which gap 112B picks up from track 113A. When these signals are summed in summing amplifier 115, they are therefore canceled, and the cross-talk is not present at the output of summing amplifier 115. Similarly, attenuator 115C is set so as to counterbalance the cross-talk which gap 112B picks up from track 113C.

Figure 12:
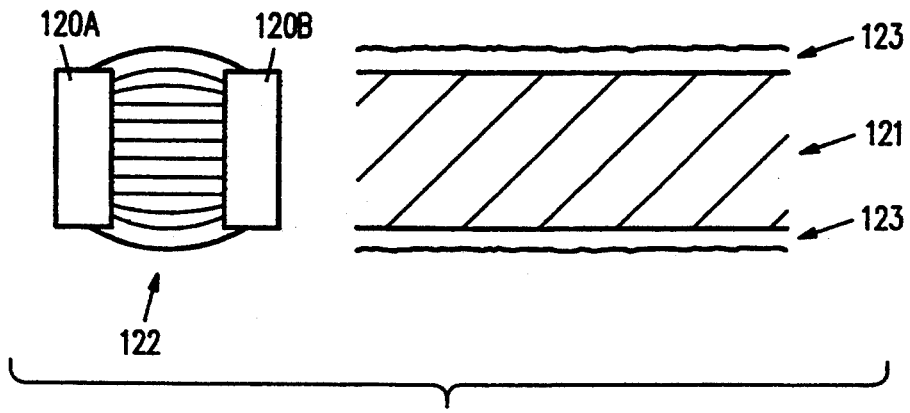
FIG. 12 illustrates the magnetic flux lines emanating from the pole tips of a recording head.

Another obstacle to reducing the track pitch is the creation of a noise fringe along the edge of the tracks during the write operation. The noise fringe arises because some of the magnetic flux lines extend outward from the side edges and corners of the pole tips. This is illustrated in FIG. 12, which shows a bottom view of pole tips 120A and 120B laid over a data track 121. As FIG. 12 indicates, while most of the flux lines 112 extend in parallel planes between pole tips 120A and 120B, some of the flux lines near the side edges and corners of the pole tips are bent outward. As a result, track 121 has noise fringes 123 on either side, rather than being clearly defined.

This problem is overcome by the write channels illustrated in FIG. 11. The signal appearing in a write channel 1110 is split into three parts. The main part flows through an amplifier 119B and generates a magnetic flux in core 111B in a customary manner. However, a second portion is delivered through an inverter 117A and an attenuator 118A to core 111A, and a third portion is delivered through an inverter 117C and an attenuator 118C to core 111C. Thus the magnetic fluxes induced in cores 111A and 111C and gaps 112A and 112C are attenuated, inverted forms of the magnetic flux generated in core 111B and gap 112B. As a result, the flux lines appearing in gaps 112A and 112C are reduced in strength and opposite in direction to those appearing in gap 112B. These oppositely directed flux lines have the effect of pushing the outwardly extending flux lines shown in FIG. 12 back towards the center of track 121 and thereby reduce or eliminate the noise fringes 123 on either side of track 121. Of course, attenuators 115A and 115C should be set at low enough levels to prevent gaps 112A and 112C from erasing or writing over the data written in tracks 113A and 113C.

Figure 14:
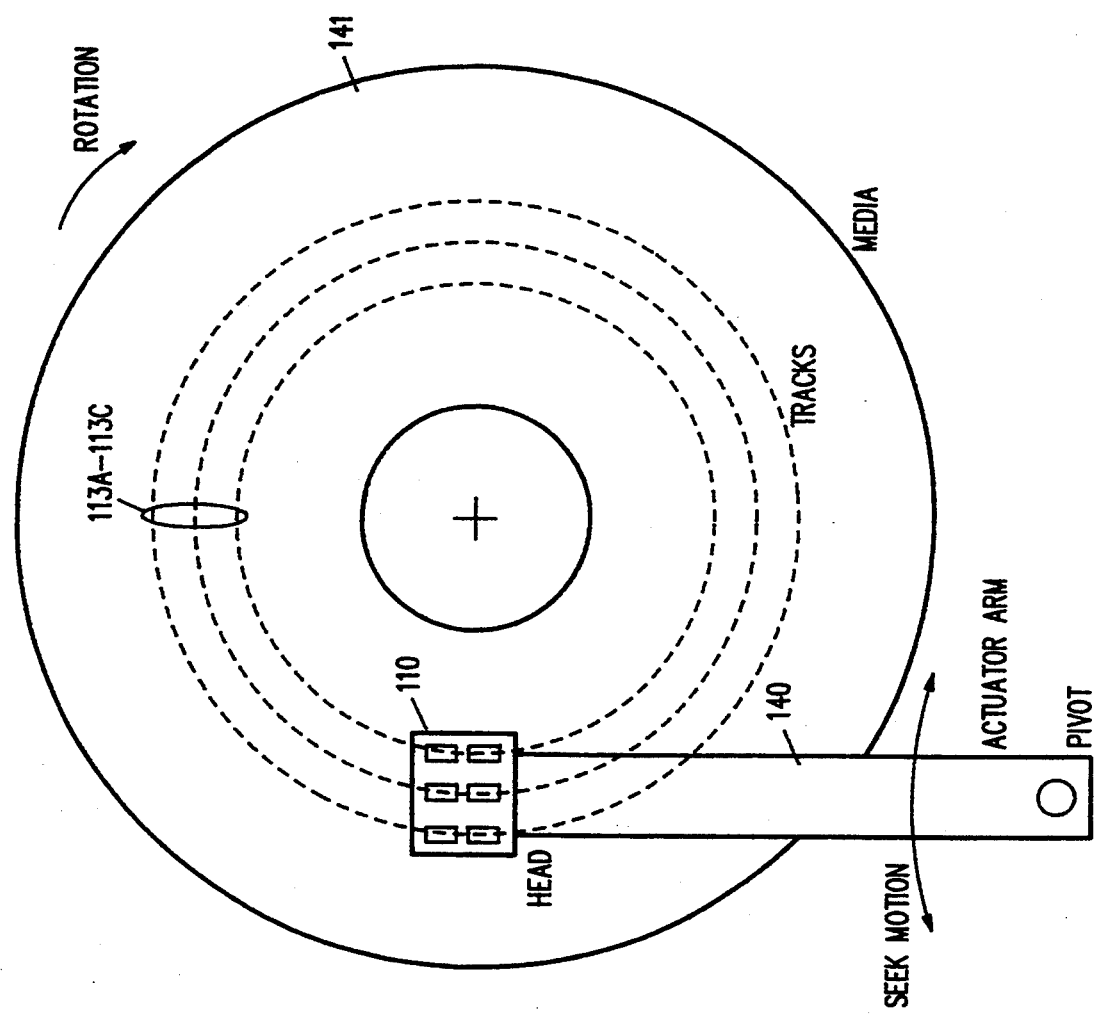
FIG. 14 illustrates a conceptual plan view of a three-gap head, actuator arm and storage disk (not drawn to scale).

FIG. 14 (not shown to scale) shows a conceptual view of head 110 mounted on an actuator arm 140 over a disk 141.

Figure 15:
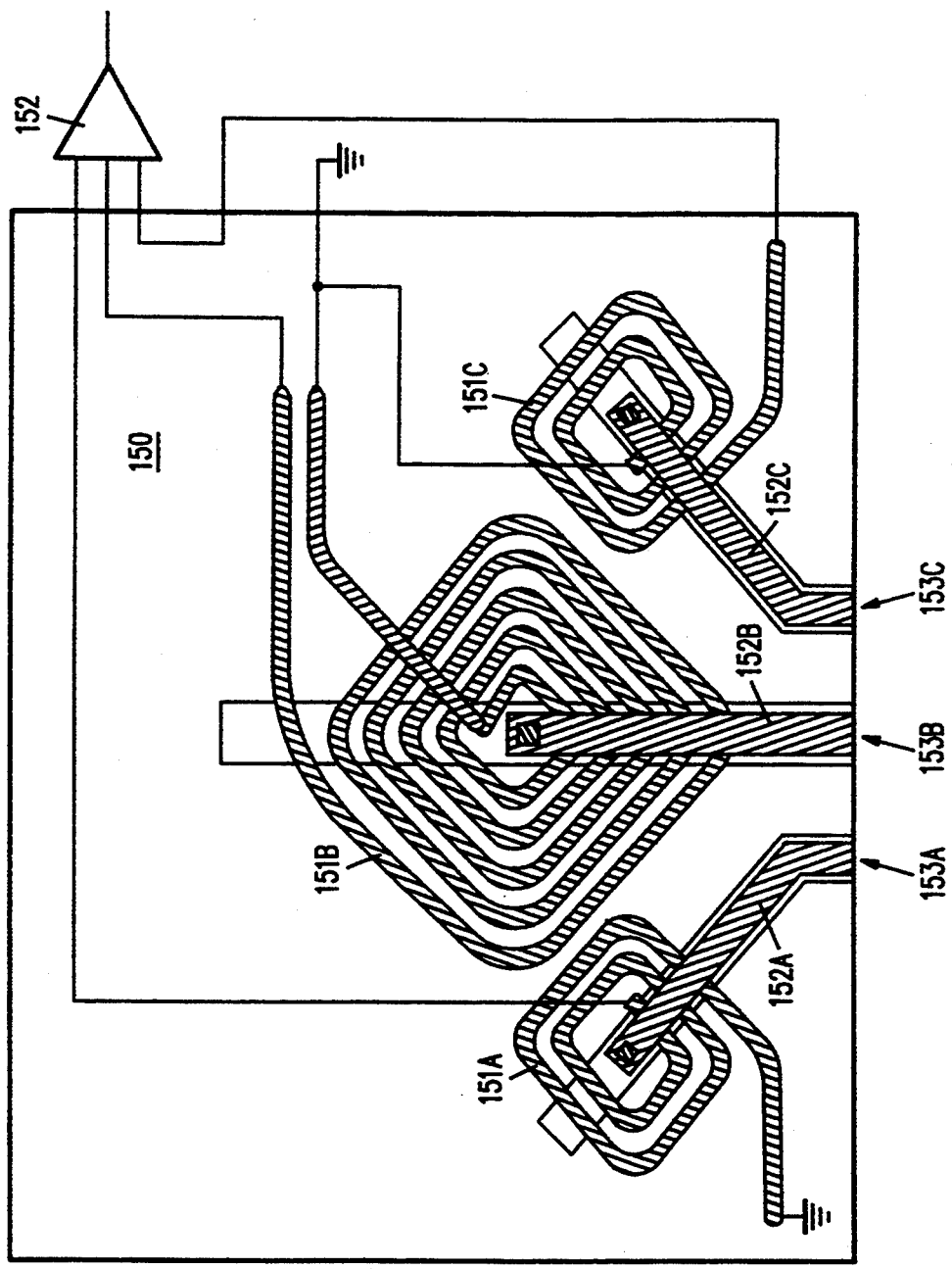
FIG. 15 illustrates a side view of the magnetic poles and coils in a three-gap head.
Figure 16:
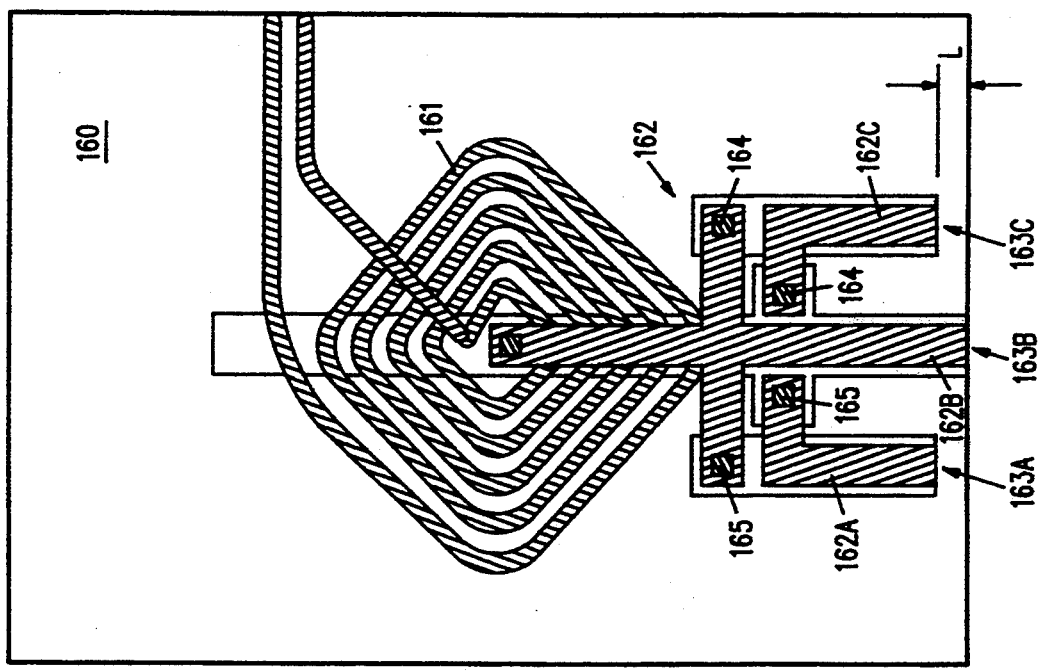
FIG. 16 illustrates an alternative embodiment of a three-gap head used for cross-talk and noise fringe reduction.

FIGS. 15 and 16 illustrate two alternative embodiments in accordance with this aspect of the invention. FIG. 15, which is an elevational view similar to FIG. 1C, shows a head 150 having three windings 151A–151C and magnetic poles 152A–152C which define respective gaps 153A–153C. One lead from each of windings 151A–151C is grounded; the other leads are connected to the inputs of a summing amplifier 152. During the read operation, windings 151A and 151C deliver a signal which is attenuated and reversed with respect to the output of winding 151B. The number of turns in windings 151A and 151C relative to the number of turns in winding 151B, and the gains of the inputs of amplifier 152, are set such that the outputs of windings 151A and 151C cancel any cross-talk that is picked up by magnetic core 152B. During the write operation, the magnetic flux in poles 152A and 152C is opposed to the flux in pole 152B, and the latter is thus focused in the manner described above.

FIG. 16 illustrates a second alternative embodiment. A head 160 contains a single winding 161 which drives a magnetic core 162 having three branches 162A–162C. Branches 162A–162C define gaps 163A–163C. Gaps 163A and 163C reduce the noise fringe during write operations and reduce cross-talk during read operations. Several techniques may be used to reduce the flux produced at gaps 163A and 163C during write operations. For example, the thickness of the magnetic poles may be reduced or the pole tips may be removed to a greater distance from the recording surface. FIG. 16 shows gaps 163A and 163C spaced an additional distance L from the recording surface as compared with gap 163B.

Phase inversion of the signals and magnetic fluxes associated with branches 162A and 162C is obtained by physical crossover means. This is illustrated in FIG. 16, where the orientation of branches 162A and 162C is reversed 180° by means of contact pairs 164 and 165. Accordingly, during read operations gaps 163A and 163C induce attenuated magnetic fluxes in core 162 which exactly counterbalance the flux from any crosstalk picked up by gap 163B. Since the cancellation takes place within core 162, no summing amplifier is required. During a write operation, a magnetic flux is induced in gaps 163A and 163C which is weaker than and directed oppositely to the flux induced in gap 163B. As described above, this reduces or eliminates the noise fringe from the track written by gap 163B.

The embodiments described above are intended to be illustrative and not limiting. Numerous additional and alternative embodiments will be apparent to those skilled in the art, all of which are included in the broad scope of this invention, as defined in the following claims.

We claim:

1. An arrangement for transferring data from a data storage disk, said arrangement comprising:
    a multiple-gap head, said multiple-gap head comprising a plurality of magnetic pole pieces, each of said pole pieces having a pair of pole tips, each pair of pole tips defining a gap;
    said data storage disk; and
    a plurality of data paths, each of said data paths being associated with one of said gaps and comprising a data synchronizer, said plurality of data paths being adapted to receive data simultaneously from said plurality of magnetic pole pieces.

2. The arrangement of claim 1 further comprising a de-serializer, said de-serializer having a plurality of inputs, each of said inputs being connected to one of said data paths, said plurality of data paths delivering said data to said de-serializer for providing a sequence of multibit words.

3. The arrangement of claim 2 wherein said de-serializer comprises a shift register.

4. An arrangement for transferring data from a data storage disk, said arrangement comprising:
    a multiple-gap head, said multiple-gap head comprising a plurality of magnetic pole pieces, each of said pole pieces having a pair of pole tips, each pair of pole tips defining a gap;
    said data storage disk; and
    a plurality of data paths, each of said data paths being associated with one of said gaps, one of said data paths comprising a data synchronizer, an output of said data synchronizer being connected to a gating means in each of said data paths, said plurality of data paths being adapted to receive data simultaneously from said plurality of magnetic pole pieces.

5. The arrangement of claim 4 wherein said data synchronizer contains a phase-locked loop.

6. The arrangement of claim 5 wherein said phase-locked loop comprises a phase comparator and a variable frequency oscillator, an output of said phase comparator being connected to an input of said oscillator, an output of said oscillator being connected to an input of said phase comparator.

7. The arrangement of claim 6 wherein a conduction path between the output of said oscillator and the input of said phase comparator includes a pulse gate, said pulse gate being configured so as to be enabled in response to a pulse representing a data bit in said one of said data paths.

8. The arrangement of claim 4 wherein each of said data paths includes a phase comparator, the outputs of said comparators being connected to a summing means, the output of said summing means being connected to a variable frequency oscillator, the output of said oscillator being connected to an input of each of said phase comparators.

9. The arrangement of claim 8 comprising a plurality of conduction paths between the output of said variable frequency oscillator and the inputs of said phase comparators, each of said parallel conduction paths including a pulse gate, each of said pulse gates being configured so as to be enabled in response to a pulse representing a data bit in one of said data paths.

10. The arrangement of claim 1 or 4 wherein each of said data paths comprises a sampled data channel.

11. The arrangement of claim 10 wherein said sampled data channel comprises a partial response maximum likelihood (PRML) system.

12. The arrangement of claim 10 wherein said sampled data channel comprises a decision feedback equalization (DFE) system.

13. The arrangement of claim 10 wherein each of said sampled data channels comprises a symbol recovery block, one of said sample data channels comprising a timing extraction block, an output of said timing extraction block being coupled to each of said symbol recovery blocks.

14. The arrangement of claim 1 or 4 wherein said head is for transferring data to and/or from a disk comprising a magnetic data storage material.

15. The arrangement of claim 1 or 4 wherein said head is for transferring data to and/or from a disk comprising a magneto-optic data storage material.

16. The arrangement of claim 1 or 4 wherein said gaps are aligned along a line perpendicular to a direction of intended relative motion between said head and a storage medium.

17. The arrangement of claim 1 or 4 wherein said gaps are aligned diagonally to a direction of intended relative motion between said head and a storage medium.

18. A disk drive comprising the multiple-gap head of claim 1 or 4.

19. A method of transferring data from a data storage disk comprising the steps of:
    reading said data simultaneously from a plurality of data tracks on said data storage disk so as to create a corresponding plurality of pulse trains, each of said pulse trains representing data stored in one of said data tracks;
    processing said pulse trains into serial data streams, said step of processing including synchronizing said pulse trains such that bits of data within said data streams fall within timing windows common to all of said serial data streams; and
    assembling said serial data streams into a parallel data stream.

20. The method of claim 19 wherein the step of processing said pulse trains comprises recovering a clock pulse from one of said pulse trains, said recovered clock pulse defining said timing windows.

21. The method of claim 20 wherein said recovered clock pulse is generated by summing a plurality of error signals each of which is representative of the position in time of individual data pulses in one of said pulse trains.

22. An arrangement for transferring data from a storage medium, said arrangement comprising:
 a head comprising a plurality of magnetic pole pieces, each of said pole pieces having a pair of pole tips, each pair of pole tips defining a gap; and
 a plurality of data paths, each of said data paths being associated with one of said gaps, only one of said data paths comprising a timing/clock recovery circuit, an output of said timing/clock recovery circuit being connected to a data retiming circuit in each of said data paths.

23. The arrangement of claim 22 further comprising a de-serializer, said de-serializer having a plurality of inputs, each of said inputs being connected to one of said data paths, said de-serializer for producing a sequence of multibit words.

24. The arrangement of claim 22 wherein said timing/clock recovery circuit contains a phase-locked loop.

25. The arrangement of claim 24 wherein said phase-locked loop comprises a phase comparator and a variable frequency oscillator, an output of said phase comparator being connected to an input of said oscillator, an output of said oscillator being connected to an input of said phase comparator.

26. The arrangement of claim 25 wherein a conduction path between the output of said oscillator and the input of said phase comparator includes a pulse gate said pulse gate being configured so as to be enabled in response to a pulse representing a data bit in said one of said data paths.

27. An arrangement for transferring data from a storage medium, said arrangement comprising:
 a head comprising a plurality of magnetic pole pieces, each of said pole pieces having a pair of pole tips, each of said pole tips defining a gap;
 a plurality of data paths, each of said data paths being associated with one of said gaps, each of said data paths including a phase comparator, respective outputs of said comparators being connected to a single combinatorial or summing means, an output of said combinatorial or summing means being connected to a variable frequency oscillator, an output of said oscillator being connected to an input of each of said phase comparators; and
 a de-serializer, said de-serializer having a plurality of inputs, each of said inputs being connected to one of said data paths, said de-serializer for producing a sequence of multibit words.

28. The arrangement of claim 27 comprising a plurality of parallel conduction paths between the output of said variable frequency oscillator and the input of each of said phase comparators, each of said parallel conduction paths including a pulse gate, each of said pulse gates being configured so as to be enabled in response to a pulse representing a data bit in one of said data paths.

29. The arrangement of claims 22 or 27 wherein each of said data paths comprises a sampled data channel.

30. The arrangement of claim 29 wherein said sampled data channel comprises a partial response maximum likelihood (PRML) system.

31. The arrangement of claim 29 wherein said sampled data channel comprises a decision feedback equalization (DFE) system.

32. The arrangement of claim 29 wherein each of said sampled data channels comprises a symbol recovery block, one of said sample data channels comprising a timing extraction block, an output of said timing extraction block being coupled to each of said symbol recovery blocks.

33. The arrangement of claims 22 or 27 wherein said head is for transferring data to and/or from a disk comprising a magnetic data storage material.

34. The arrangement head of claims 22 or 27 wherein said head is for transferring data to and/or from a tape comprising a magnetic data storage material.

35. The arrangement of claims 22 or 27 wherein said head is for transferring data to and/or from a disk comprising a magneto-optic data storage material.

36. The arrangement of claims 22 or 27 wherein said gaps are aligned along a line perpendicular to a direction of intended relative motion between said head and a storage medium.

37. The arrangement of claims 22 or 27 wherein said gaps are aligned diagonally to a direction of intended relative motion between said head and a storage medium.

38. A disk drive comprising the arrangement of claims 22 or 27.

* * * * *

UNITED STATES PATENT AND TRADEMARK OFFICE
CERTIFICATE OF CORRECTION

PATENT NO.   :   5,426,539
DATED        :   June 20, 1995
INVENTOR(S)  :   William D. Llewellyn and Robert J. Strain It is certified that error appears in the above-identified patent and that said Letters Patent is hereby corrected as shown below:

Col. 9, line 53, Claim 4 delete "bead" and insert --head--.

Col. 10, line 21, Claim 9 delete "parallel".

Col. 10, line 53, Claim 18 delete "multiple-gap head" and insert --arrangement--.

Col. 11, line 23, Claim 23 delete ".".

Signed and Sealed this

Twelfth Day of December, 1995

Attest:

BRUCE LEHMAN

Attesting Officer

Commissioner of Patents and Trademarks